(No Model.)

G. A. CARPENTER.
COUPLING FOR ELECTRIC CONDUCTING WIRES.

No. 355,380. Patented Jan. 4, 1887.

Witnesses
Chas. L. Taylor
J. C. Gamer

Inventor
Geo. A. Carpenter
By his Attorneys
C. A. Knowles

UNITED STATES PATENT OFFICE.

GEORGE ARNOLD CARPENTER, OF PROVIDENCE, RHODE ISLAND.

COUPLING FOR ELECTRIC CONDUCTING-WIRES.

SPECIFICATION forming part of Letters Patent No. 355,380, dated January 4, 1887.

Application filed October 15, 1886. Serial No. 216,354. (No model.)

*To all whom it may concern:*

Be it known that I, GEORGE ARNOLD CARPENTER, a citizen of the United States, residing at Providence, in the county of Providence and State of Rhode Island, have invented a new and useful Improvement in Couplings for Electrical Conducting-Wires, of which the following is a specification.

My invention relates to an improvement in couplings for electrical conducting-wires; and it consists in the peculiar construction and combination of devices that will be more fully set forth hereinafter, and particularly pointed out in the claim.

The object of my invention is to provide a coupling for electrical conducting-wires which shall be strong, compact, easily operated to connect the wires and disconnect the same, and that will be found entirely efficient and offer practically no resistance to the electric current.

Figure 1:
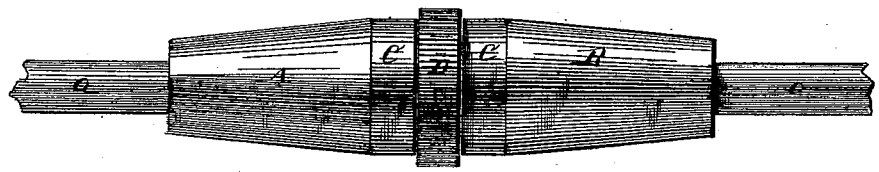
Figure 2:
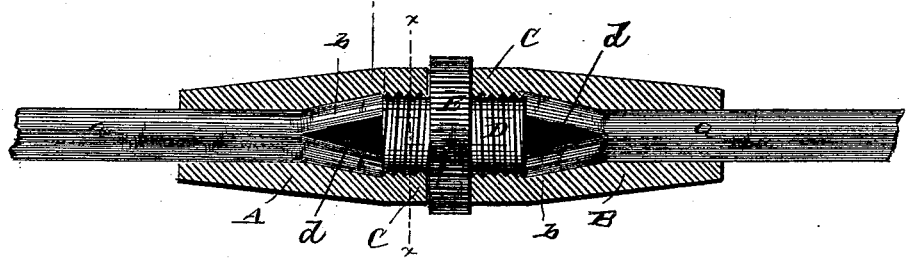
Figure 3:
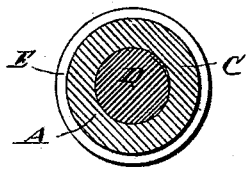
Figure 4:
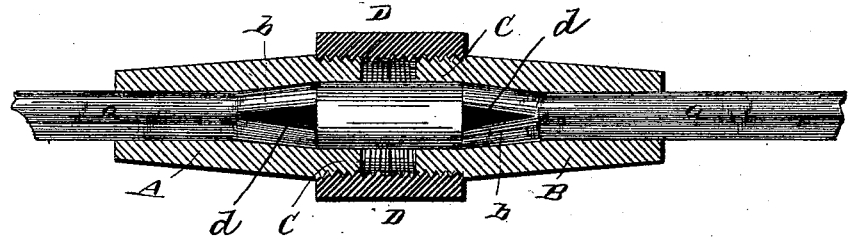

In the drawings, Figure 1 is a side elevation of a wire-coupling embodying my improvements. Fig. 2 is a longitudinal sectional view of the same. Fig. 3 is a transverse sectional view taken on the line x x of Fig. 2. Fig. 4 is a longitudinal sectional view of a modified form of my invention.

A and B represent a pair of hollow sleeves, which are made of brass or copper or other suitable conducting material, and have their inner ends enlarged, as at C. The said enlarged ends of the sleeves are provided with interior screw-threads.

D represents a cylindrical nut, which is provided at opposite extremities with right and left hand screw-threads adapted to engage the screw-threads in the sleeves, and in the center of the said nut is formed an annular collar, E, the periphery of which is milled.

The operation of my invention is as follows: The ends of the wires a which are to be joined are either upset by being hammered while held in a suitable vise or are split with a saw, and the two parts, thus formed, spread apart by means of wedges d, thereby forming heads b on the ends of the wires. The wedges are left in the forked ends of the wires to prevent the same from closing under strain. Previously to forming the said heads on the ends of the wires the sleeves A and B are slipped onto the said wires, so that when the heads are formed they enter the enlarged openings C at the inner ends of the sleeves, and thus prevent the wires from being withdrawn therefrom. The two sleeves are then secured together by means of the nut D. It will be observed that by turning the nut in one direction the sleeves will be drawn toward each other, so as to force the ends of the wires against the ends of the nut. The latter is also made of brass or copper, or other suitable conducting material and thus no practical resistance is offered to the passage of the electric current. The milled edge of the collar E enables the nut to be turned, so as to draw the sleeves together or to move them apart.

From the foregoing it will be readily understood that by means of a coupling thus constructed the two ends of the conducting-wire may be readily secured together and as readily detached when desired.

In Fig. 4 I illustrate a modified form of my invention, in which the enlarged ends of the sleeves are provided on their outer sides with the right and left hand screw-threads, and the nut is formed in the shape of a hollow cylinder having right and left hand screw-threads on its inner side to engage the threaded ends of the sleeves. A conducting-plug is placed between the headed ends of the wires when the coupling is attached thereto, so as to force the ends of the wires into the enlarged openings in the sleeves, and also to establish direct connection between the ends of the wires and prevent them from working loose in the coupling.

Having thus described my invention, I claim—

In a coupling for electrical conducting-wires, the combination of the sleeves adapted to be secured together and having the enlarged or flared openings at their inner ends, the wires in the sleeves, and the wedges driven into the inner ends of the wires to form enlarged heads thereon, for the purpose set forth, substantially as described.

In testimony that I claim the foregoing as my own I have hereto affixed my signature in presence of two witnesses.

GEORGE ARNOLD CARPENTER.

Witnesses:
J. S. LATHAM,
BERNARD McGUINNESS.